United States Patent
Kockott

[15] 3,686,940
[45] Aug. 29, 1972

[54] ULTRAVIOLET TESTING APPARATUS WITH SELECTIVE MIRRORS FOR REMOVING INFRARED RADIATION

[72] Inventor: Dieter Kockott, Ruckingen, Germany

[73] Assignee: Original Hawau Quarzlampen GmbH, Hohensonne-Strabe, West Germany

[22] Filed: March 22, 1971

[21] Appl. No.: 126,780

[30] Foreign Application Priority Data

March 25, 1970 Germany..........P 20 14 288.5

[52] U.S. Cl..................73/150, 73/159, 73/432 SD, 240/47, 250/86, 250/89
[51] Int. Cl.............................................G01n 17/00
[58] Field of Search .73/150 R, 159, 432 SD; 250/86, 250/87, 88, 89; 240/11, 47, 1.1

[56] References Cited

UNITED STATES PATENTS

| | | | |
|---|---|---|---|
| 2,804,770 | 9/1957 | Gunther | 73/150 |
| 2,016,474 | 10/1935 | Wood | 250/86 |
| 2,987,914 | 6/1961 | Gunther | 73/150 |
| 3,224,266 | 12/1965 | Klippert | 73/150 |
| 3,237,005 | 2/1966 | Norton | 240/47 |

*Primary Examiner*—S. Clement Swisher
*Attorney*—Sughrue, Rothwell, Mion, Zinn & Macpeak

[57] ABSTRACT

A water cooled tube has radial fins that extend to the surface of a surrounding cylindrical mirror that passes ultraviolet radiation and visible light while reflecting infrared radiation. Planar mirrors that reflect ultraviolet and visible light and pass infrared are disposed between the extremities of the fins to form a polygon within the cylinder. Light sources are disposed in each area between a planar mirror and the cylindrical mirror. Ultraviolet radiation and visible light are thus directly passed or reflected through the cylindrical mirror to an external test sample chamber, while infrared radiation is directly passed or reflected through the planar mirrors to the fins, which absorb the infrared radiation and conduct the heat therefrom to the cooling tube.

5 Claims, 2 Drawing Figures

Patented Aug. 29, 1972
3,686,940
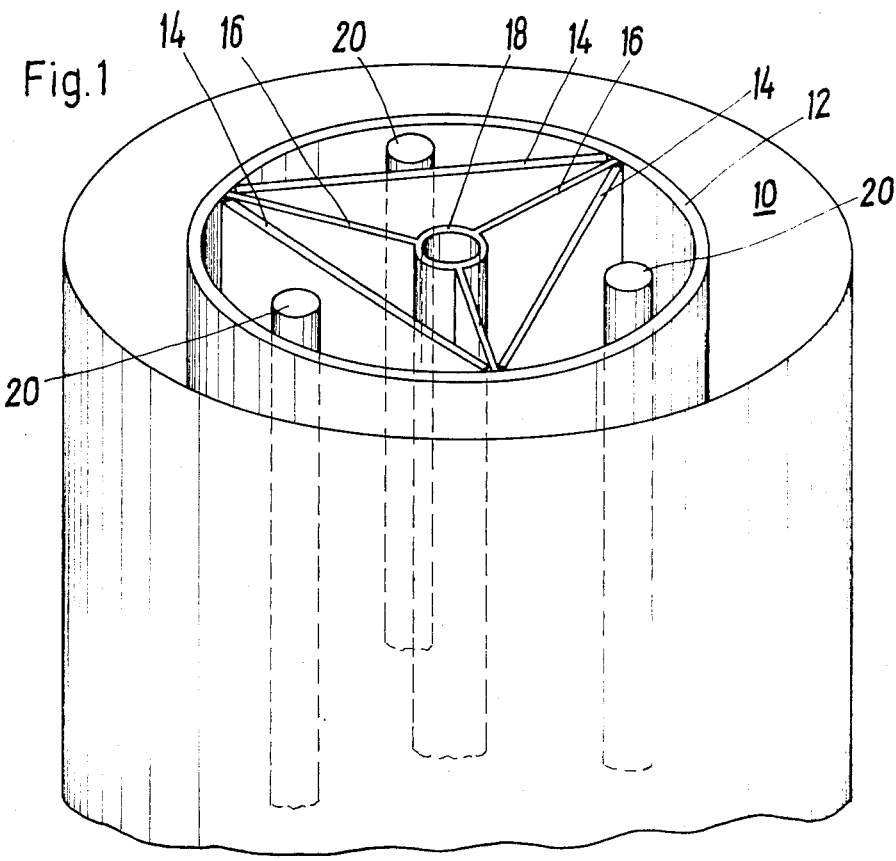
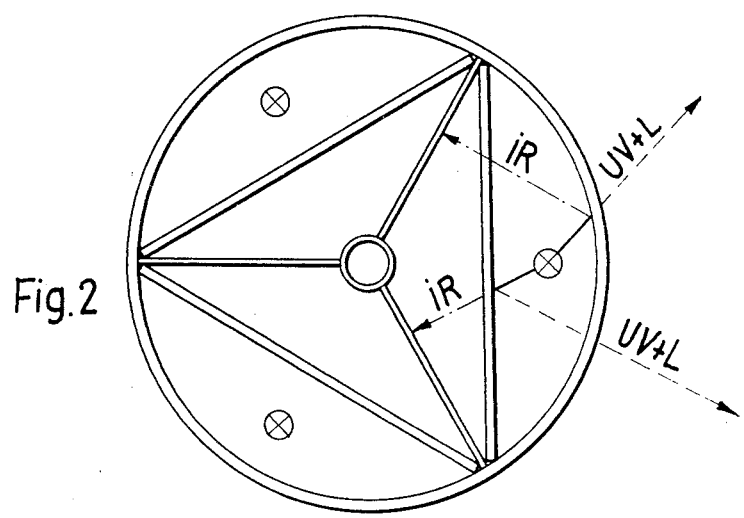
Inventor:
DIETER KOCKOTT
Sughrue, Rothwell, Mion,
Zinn & Macpeak
BY ATTORNEYS

ULTRAVIOLET TESTING APPARATUS WITH SELECTIVE MIRRORS FOR REMOVING INFRARED RADIATION

BACKGROUND OF THE INVENTION

1. Field of the Invention:

This invention relates in general to an ultraviolet testing apparatus, and more particularly to an apparatus for testing the effects of ultraviolet radiation and visible light on test samples disposed in a sample chamber provided with fixed light sources.

2. Description of the Prior Art:

Testing apparatuses of this general type are known which include a centrally located light source and sample carriers which rotate around the source. For high speed testing of the color fastness of materials, it is necessary to expose the relatively small test samples to ultraviolet radiation of high intensity similar to natural sunlight to simulate naturally occurring deterioration. When high intensity ultraviolet radiation is artificially produced, however, a considerable degree of infrared radiation is simultaneously produced, which gives rise to considerable cooling problems in the testing apparatus. Furthermore, the unwanted infrared radiation influences the deteriorating reactions in the test samples, so that the changes in the samples are not clearly related to the effects of ultraviolet radiation alone. As a result, the various testing standards which are fixed for testing the weatherproofness and colorfastness of materials require that the infrared radiation level at the test samples be held below certain minimum levels.

One way of meeting this problem in the prior art has been to surround the light source with infrared radiation absorption filters to reduce the amount of infrared radiation escaping to the sample chamber. The difficulty has been, however, that there are no absorption filters which are sufficiently resistant to the effects of such radiation, which adequately absorb in the infrared region between 800 and 1000 nm (1 nm = $10^{-9}$ meters) and which are simultaneously permeable in the long wave length region of ultraviolet radiation between 300 and 400nm.

An approach to overcome the high degree of ultraviolet absorption of known absorption filters for infrared radiation has involved the use of cylindrical and symmetrically arranged reflecting filters, which reflect the infrared radiation back into the interior of the sample chamber while passing visible light and ultraviolet radiation into the test sample area. The effectiveness of the reflecting layers in such filters is relatively low, however, and problems arise with respect to cooling the center of the reflecting filters.

It has also been proposed to dispose the light sources outside of the sample chamber and to provide two plane mirrors parallel to each other, one of which reflects infrared radiation and the other of which reflects visible light and ultraviolet radiation. With this combination, infrared radiation is reflected in one semiplane, while visible light and ultraviolet radiation is reflected in the other semiplane. Such an arrangement is not suitable when the light sources are located inside the sample chamber, however, because the thermal load caused by the infrared radiation is too large.

SUMMARY OF THE INVENTION

According to this invention, the above-noted disadvantages and drawbacks attendant with the prior art systems are effectively overcome by enclosing two or more light sources within a cylindrical mirror which passes visible light and ultraviolet radiation and reflects infrared radiation. A water cooled tube is located in the center of the cylindrical mirror and is provided with radial fins that extend outwardly to the surface of the cylindrical mirror. The fins are painted or coated black to effect an optimum absorption of infrared radiation. A plurality of planar mirrors that transmit infrared radiation and reflect visible light and ultraviolet radiation are also provided joining the outward edges of adjacent radial fins. The arrangement is such that the planar mirrors form a polygon within the cylindrical mirror and the radial fins extend outwardly from the central cooling tube to the vertices of the polygon. The light sources are disposed within the areas bounded by a planar mirror on one side, and an arc of the cylindrical mirror on the other side. A cylindrical sample chamber for carrying test samples surrounds the cylindrical mirror. With this arrangement, ultraviolet radiation and visible light are directly passed or reflected through the cylindrical mirror into the sample chamber, while infrared radiation is directly passed or reflected through the planar mirrors onto the radial fins, where the heat created by the infrared radiation is conducted to the central tube and carried away by the cooling water.

BRIEF DESCRIPTION OF THE DRAWINGS

In the drawings:

FIG. 1 is a perspective view of the apparatus of this invention employing three light sources, by way of example, and FIG. 2 is a plan view of the apparatus.

DESCRIPTION OF THE PREFERRED EMBODIMENT

Referring to FIG. 1, a cylindrical mirror 12 is centrally arranged in a sample chamber 10 and surrounds two or more linear light sources 20, there being three shown in the preferred embodiment in the drawings. A water cooled tube 18 is provided in the center of the cylindrical mirror 12, and radial heat absorbing and conducting fins 16 extend from the cooling tube 18 to the surface of the cylindrical mirror 12. A plurality of planar mirrors 14 equal to the number of light sources 20 are arranged as shown to form a polygon within the cylindrical mirror 12, the polygon being a triangle in the example shown. The light sources 20 are positioned in the areas bounded by a planar mirror 14 on one side and an arc of the cylindrical mirror 12 on the other side.

The cylindrical mirror 12 reflects the infrared radiation IR of the light sources 20 back into the interior of the cylinder and transmits the visible light L and the ultraviolet radiation UV into the sample chamber 10. The planar mirrors 14 are permeable to and pass the infrared radiation IR, and reflect the visible light L and the ultraviolet radiation UV back through the cylindrical mirror 12 and into the sample chamber 10. The combination of the cylindrical mirror 12 and the planar mirrors 14 results in an extensive reflection of the infrared radiation IR into the center of the cylindrical mirror, while on the other hand, substantially all of the visible light L and the ultraviolet radiation UV is ultimately directed into the sample chamber 10. Therefore, the amount of infrared radiation IR in the rays reaching the sample chamber 10 is very low. The radial fins 16, which may be blackened copper sheets, exhibit a high absorption factor for the infrared radiation IR and rapidly conduct the heat produced thereby to the cooling tube 18. With this arrangement of the radial fins 16 and the cooling tube 18, the removal of the heat generated by the infrared radiation IR is sufficient to preclude any temperature problems in sample chamber 10.

It is apparent that with the above-described combination of the internal light sources 20 together with the selectively reflecting and permeable mirrors 12 and 14, the short wave length infrared radiation IR is largely eliminated in the sample chamber 10 without any significant attenuation of the ultraviolet radiation UV. At the same time, the problem of heat removal from the center of the cylindrical mirror 12 is effectively solved by the cooling tube 18 and its heat absorbing and conducting radial fins 16.

What is claimed is:

1. In an apparatus for exposing test samples to ultraviolet radiation and visible light from light sources that also produce unwanted infrared radiation, a selective filtering arrangement comprising:
   a. cylindrical means surrounding the light sources for passing ultraviolet radiation and visible light and blocking infrared radiation;
   b. means for passing infrared radiation and blocking ultraviolet radiation and visible light disposed within the cylindrical means and defining therein a central heat chamber;
   c. the light sources being disposed between the cylindrical means and the passing means;
   d. means for transferring heat from the infrared radiation out of the central chamber, and
   e. test sample exposing means exterior of the cylindrical means, whereby ultraviolet radiation and visible light is passed through the cylindrical means to the test sample exposing means while infrared radiation is passed through the passing means into the central chamber.

2. An apparatus as defined in claim 1 wherein:
   a. the cylindrical means is a cylindrical mirror that passes ultraviolet radiation and visible light and reflects infrared radiation, and
   b. the passing means are planar mirrors that pass infrared radiation and reflect ultraviolet radiation and visible light.

3. An apparatus as defined in claim 2 wherein the planar mirrors define a polygon whose vertices abut the inner surface of the cylindrical mirror.

4. An apparatus as defined in claim 3 wherein the heat transferring means comprises a fluid cooled tube having heat conducting radial fins extending to the vertices of the polygon.

5. An apparatus as defined in claim 3 wherein the test sample exposing means comprises a cylindrical chamber surrounding the cylindrical mirror.

* * * * *